United States Patent
Pasolini

(10) Patent No.: US 9,383,591 B2
(45) Date of Patent: Jul. 5, 2016

(54) STABILIZED PICO-PROJECTOR DEVICE AND RELATED IMAGE STABILIZATION METHOD

(71) Applicant: STMicroelectronics S.r.l., Agrate Brianza (IT)

(72) Inventor: Fabio Pasolini, S. Martino Siccomario (IT)

(73) Assignee: STMicroelectronics S.r.l., Agrate Brianza (IT)

(*) Notice: Subject to any disclaimer, the term of this patent is extended or adjusted under 35 U.S.C. 154(b) by 190 days.

(21) Appl. No.: 13/975,429

(22) Filed: Aug. 26, 2013

(65) Prior Publication Data
US 2014/0063473 A1 Mar. 6, 2014

(30) Foreign Application Priority Data
Aug. 31, 2012 (IT) ............................. TO2012A0756

(51) Int. Cl.
G03B 21/28 (2006.01)
H04N 9/31 (2006.01)
G02B 27/64 (2006.01)
G03B 21/14 (2006.01)

(52) U.S. Cl.
CPC ............ *G02B 27/646* (2013.01); *G03B 21/142* (2013.01); *H04N 9/312* (2013.01); *H04N 9/3173* (2013.01); *H04N 9/3185* (2013.01); G03B 21/28 (2013.01); H04N 9/3129 (2013.01)

(58) Field of Classification Search
CPC .... G03B 21/28; G03B 21/2033; G03B 29/00; H04N 9/3129; H04N 9/3194; H04N 9/3185; H04N 9/3173
USPC .......................................... 353/69, 70, 98, 99
See application file for complete search history.

(56) References Cited

U.S. PATENT DOCUMENTS

| | | | |
|---|---|---|---|
| 2009/0079945 A1* | 3/2009 | Klosowiak et al. | 353/69 |
| 2009/0180167 A1* | 7/2009 | Tani et al. | 359/198.1 |
| 2011/0111849 A1 | 5/2011 | Sprague et al. | |
| 2012/0002178 A1 | 1/2012 | Bowen et al. | |
| 2012/0092567 A1* | 4/2012 | Jikuya et al. | 348/789 |

OTHER PUBLICATIONS

Italian Search Report for TO2012A000756 dated Apr. 26, 2013 (7 pages).

* cited by examiner

*Primary Examiner* — William C Dowling
*Assistant Examiner* — Ryan Howard
(74) *Attorney, Agent, or Firm* — Gardere Wynne Sewell LLP

(57) ABSTRACT

A pico-projector device includes a light source operable to generate a light beam as a function of an image to be generated, a mirror mechanism operable to direct the light beam towards a displaying surface, and a driving circuit that supplies driving signals for controlling movement of the mirror mechanism. The driving circuit includes a compensation stage that receives angular velocity signals from a gyroscopic sensor coupled to the pico-projector device and generates the driving signals as a function of the angular velocity signals, thereby stabilizing the image projected on the displaying surface with respect to undesired movements of the pico-projector device.

15 Claims, 4 Drawing Sheets

STABILIZED PICO-PROJECTOR DEVICE AND RELATED IMAGE STABILIZATION METHOD

PRIORITY CLAIM

This application claims priority from Italian Application for Patent No. TO2012A000756, filed Aug. 31, 2012, the disclosure of which is incorporated by reference.

TECHNICAL FIELD

The present invention relates to a stabilized pico-projector device and to a related image stabilization method.

BACKGROUND

It is known that portable electronic apparatuses, such as smartphones, PDAs, etc., are today used for a wide range of applications, such as, for example, reproduction of texts, photos, and videos, and remote connectivity via videoconference, which require presentation of large amounts of data and images on the corresponding display.

The display is, however, generally of small dimensions, given the portable nature of these apparatuses, so that displaying these data and images is not always practical for the user.

Recently, use has been proposed of image projectors inside portable electronic apparatuses (both as separate accessories and as modules integrated in the portable apparatuses) capable of projecting at a distance on any displaying surface (for example, the wall of a room) images of large dimensions corresponding to the contents showed on the display.

The use of projectors advantageously enables both a considerable increase in the surface available for display of information and sharing of the information with a number of people by the user of the portable apparatus, for example, for performing a presentation.

Pico-projectors generally include a light source, for example, of a laser type, which, appropriately driven as a function of the image to be projected, directs a light beam on a mirror mechanism, which is in turn driven so as to direct the light beam on the displaying surface, according to a scanning scheme of the raster type, in a way similar to the techniques traditionally used in the television field. In particular, the image is generated and projected pixel by pixel on the display.

In order to reduce the dimensions of pico-projectors, both the mirror mechanism and the electronic control and driving circuitry may be made, in an integrated manner, with the semiconductor technology. In particular, the mirror mechanism may be manufactured with MEMS (Micro Electro Mechanical System) technology.

Albeit advantageous for the reason set forth above, today the use of pico-projectors in combination with portable electronic apparatuses suffers from an important limitation, linked to the poor stability of the images that are projected on the displaying surface on account of inevitable undesirable movements of the portable apparatuses, due in general to vibrations coming from the external environment, for example, to trembling of the hand of the user handling them or to vibrations of a surface on which the same portable apparatuses are resting (for example, a table in a moving train).

There is a need in the art to solve this problem, thus improving the experience of use of pico-projectors, in particular in the case of portable apparatuses.

SUMMARY

In an embodiment, a pico-projector device comprises: a light source operable to generate a light beam as a function of an image to be generated; a mirror mechanism operable to direct the light beam towards a displaying surface; and a driving circuit configured to supply driving signals for movement of said mirror mechanism, said driving circuit further comprising a compensation stage configured to receive angular velocity signals from a gyroscopic sensor coupled to said pico-projector device, and to generate said driving signals as a function of said angular velocity signals, thereby stabilizing the image projected on said displaying surface with respect to undesired movements of said pico-projector device.

In an embodiment, an image stabilization method, comprises: receiving angular velocity signals from a gyroscopic sensor coupled to a pico-projector device which includes: a light source operable to generate a light beam as a function of an image to be generated; and a mirror mechanism operable to direct said light beam towards a displaying surface; and generating driving signals for controlling movement of said mirror mechanism as a function of said angular velocity signals thereby stabilizing the image projected on said displaying surface with respect to undesired movements of said pico-projector device.

In an embodiment, a projector device comprises: a gyroscopic sensor configured to generate angular velocity signals; a light source configured to generate a light beam; a movable mirror configured to direct the light beam; a mirror drive circuit configured to control movement of the movable mirror using drive signals; and a compensation circuit within the mirror drive circuit that receives the angular velocity signals and applies a correction to the drive signals to compensate for motion indicated by said angular velocity signals.

BRIEF DESCRIPTION OF THE DRAWINGS

For a better understanding of the present invention, preferred embodiments thereof are now described, purely by way of non-limiting example, with reference to the attached drawings, wherein.

DETAILED DESCRIPTION OF THE DRAWINGS

As will be clarified in detail hereinafter, one aspect envisages, when generating the light beam for projection by the pico-projector device of an image on a displaying surface, the use of a compensation stage, based on information of angular velocity detected by a gyroscopic sensor, so as to make suitable corrections to the motion required of the mirror mechanism and compensate for undesired movements. It is thus possible to obtain a stabilization of the image generated and projected on the displaying surface.

Figure 1:
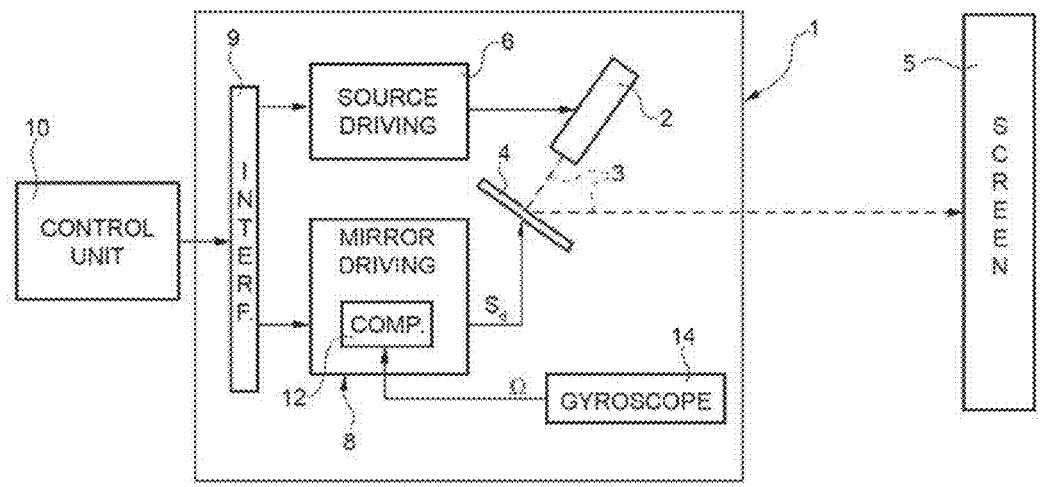
FIG. 1 is a block diagram of a pico-projector device.

FIG. 1 shows a pico-projector device, designated as a whole by reference 1, in particular designed to be operatively coupled to a portable electronic apparatus (as illustrated hereinafter).

The pico-projector device 1 comprises: a light source 2, for example, of a laser type, designed to generate a light beam 3; a mirror mechanism 4, of a MEMS type, designed to receive the light beam 3 and to direct it towards a screen or displaying surface 5 (external to and set at a distance from the pico-projector device 1); a first driving circuit 6, designed to provide suitable control signals to the light source 2, for generation of the light beam 3 as a function of an image to be projected; a second driving circuit 8, designed to provide suitable control signals to the mirror mechanism 4 for movement thereof, for example, according to a raster scanning scheme, for projection of the image on the displaying surface 5, pixel by pixel; and a communication interface 9, designed to receive, from an external control unit 10, for example, included in the portable apparatus, information on the image to be generated, for example, in the form of an array of pixels. The information is sent at input to the first and second driving circuits 6, 8, for driving, respectively, the light source 2 and the mirror mechanism 4.

According to one aspect, the second driving circuit 8 comprises a compensation stage 12, designed to enable compensation of undesired movements of the pico-projector device 1 during generation and projection of the image on the displaying surface 5; these undesired movements may be due to vibrations coming from the external environment, on account, for example, of trembling of the hand of the user of the portable electronic apparatus, or to vibrations of a surface on which the portable electronic apparatus is resting.

The compensation stage 12 receives at input, from a gyroscopic sensor 14, fixed with respect to the pico-projector device 1 (and to the portable apparatus), angular velocity signals Ω, indicating rotations of the pico-projector device 1, for example, rotations of yaw, and/or pitch, and/or roll, and makes suitable corrections to driving signals $S_d$ supplied to the mirror mechanism 4 (these determined on the basis of the image array to be generated), as a function of the same angular velocity signals Ω.

The gyroscopic sensor 14 may be integrated in the pico-projector device 1 (as in the example illustrated) or else may form part of the portable electronic apparatus, having, for example, further functions in the same portable electronic apparatus, for example, for recognition of gesture commands imparted by the user (and having, for this purpose, different measurement scales and parameters, according to the intended use of the detected angular velocities).

Figure 2:
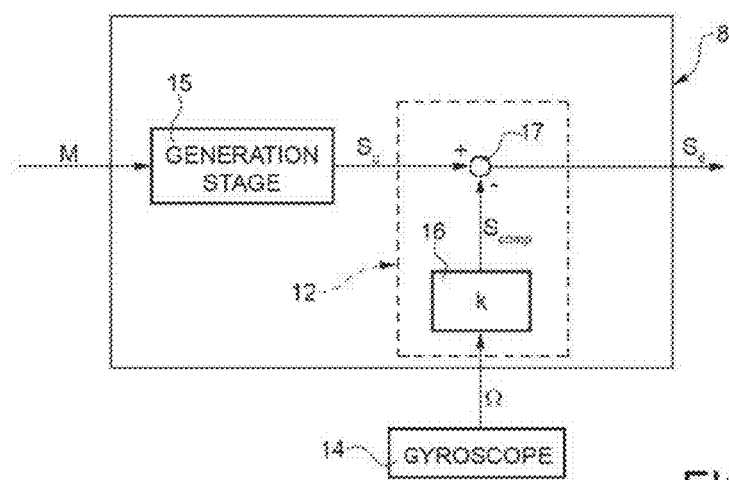
FIG. 2 shows a compensation stage in the pico-projector device of FIG. 1.

In greater detail, and as illustrated schematically in FIG. 2, the second driving circuit 8 comprises a generator stage 15, which receives at its input the image array, here designated by M, and generates control signals $S_c$, as a function of the image array M and of a desired scanning path on the displaying surface 5.

The compensation stage 12 of the second driving circuit 8 comprises: a processing unit 16, which receives at its input from the gyroscopic sensor 14 the angular velocity signals Ω, and processes the same signals, for example, by multiplication by a corrective factor k, to obtain compensation signals $S_{comp}$; and a combination unit 17, which receives at its inputs the control signals $S_c$ and the compensation signals $S_{comp}$, and generates, as a function of said control signals $S_c$ and compensation signals $S_{comp}$, the driving signals $S_d$, which are then supplied to the mirror mechanism 4 for movement thereof.

For example, the combination unit 17, which appropriately combines the compensation signals $S_{comp}$ and the control signals $S_c$, includes an adder with sign, designed for performing a subtraction between the same control signals $S_c$ and compensation signals $S_{comp}$.

In general, the compensating action performed based on the angular velocity signals Ω is thus of a "feedforward" type, with respect to the driving signals $S_d$ designed for actuation of the mirror mechanism 4.

Advantageously, the compensation stage 12 may be further configured so as to perform suitable filtering operations of the angular velocity signals Ω, in order to discriminate, for example, the undesired movements of the portable electronic apparatus, for instance, due to trembling of the user's hand, with respect to desired movements of the same portable electronic apparatus, for example, due to gesture commands imparted by the user, on the basis, for example, of the frequency content of the signals. In this case, the compensation operation is advantageously performed by the compensation stage 12 solely based on the undesired movements, discriminated in the above manner.

In a way not shown, the second driving circuit 8 further performs a feedback control of the actuation of the mirror mechanism 4, based on detection of the position assumed each time by the mirror mechanism 4, by means of suitable position sensors, for example, of a capacitive type.

Figure 3:
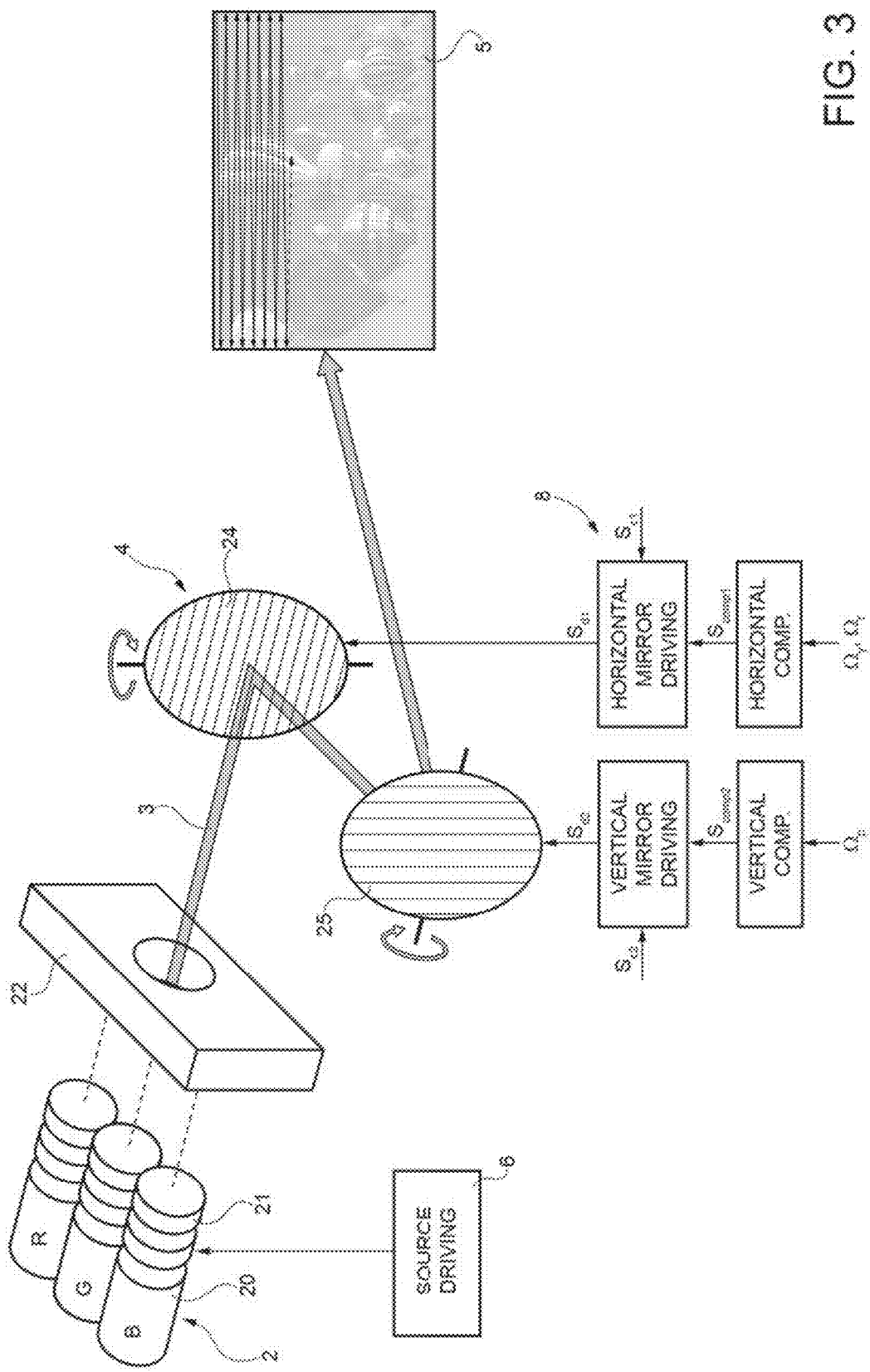
FIG. 3 is a schematic illustration of one embodiment of the pico-projector device of FIG. 1.

In a possible embodiment, illustrated in FIG. 3, the light source 2 of the pico-projector device 1 is an RGB laser source, including: a laser diode 20 and an associated lens 21, for each colour, red (R), green (G), and blue (B), and moreover a combiner stage 22, which receives the beams of light from the laser diodes 20 and combines them in a resulting beam, the light beam 3, directed towards the mirror mechanism 4.

The mirror mechanism 4 comprises, in the example: a first mirror 24, designed to generate a horizontal scan of the light beam 3 on the displaying surface 5; and a second mirror 25, designed to generate a vertical scan of the light beam 3 on the same displaying surface 5.

In particular, the horizontal scan, which defines each line of the image generated, may be performed (in a known manner, here not described in detail) with a sinusoidal pattern at the resonance frequency of the mechanical structure, whereas the vertical scan, which defines each frame of the generated image, may have a sawtooth pattern, to ensure a movement at constant velocity from a bottom end to a top end of the image, and a fast return to the starting point, once scanning of a given frame, line by line, is completed.

In this embodiment, the second driving circuit 8 generates, in a way similar to what has been previously discussed, distinct driving signals, here designated by $S_{d1}$ and $S_{d2}$, for movement of the first and second mirrors 24, 25. In particular, the compensation stage 12 generates, again in a way similar to what has been previously discussed, distinct compensation signals $S_{comp1}$, $S_{comp2}$, as a function of a yaw angular velocity $\Omega_y$ and/or a roll angular velocity $\Omega_r$ detected by the gyroscopic sensor 14, and, respectively, of a pitch angular velocity $\Omega_p$ detected by the same gyroscopic sensor 14. The compensation signals $S_{comp1}$, $S_{comp2}$, suitably combined with respective control signals $S_{c1}$, $S_{c2}$, are then used for generation of the driving signals $S_{d1}$ and $S_{d2}$, for compensation of the horizontal movement of the first mirror 24 and, respectively, of the vertical movement of the second mirror 25.

Figure 4:
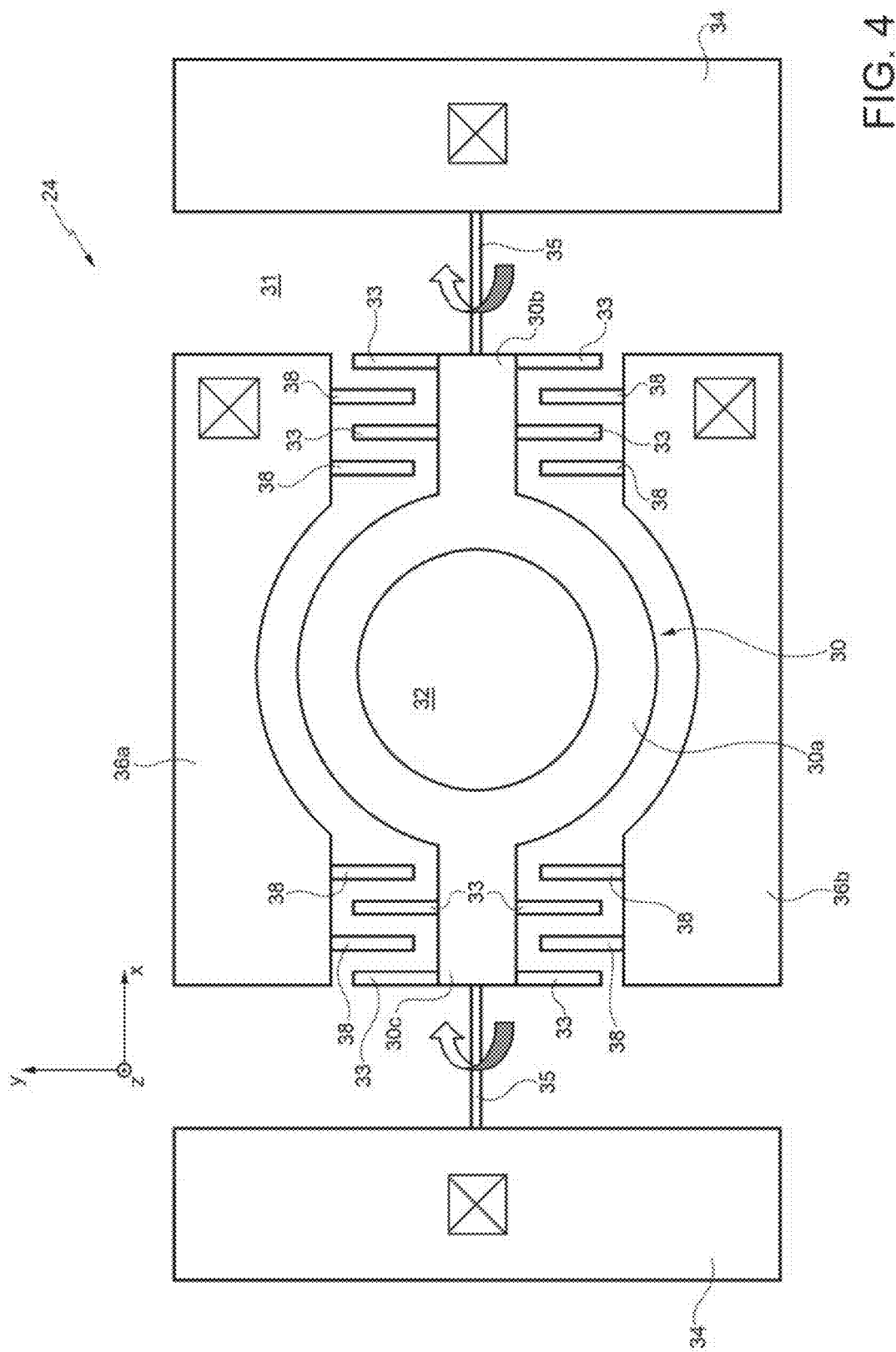
FIG. 4 is a top plan view of a portion of a mirror mechanism in the pico-projector device of FIG. 1.

FIG. 4 shows, by way of example, a possible embodiment of the first mirror 24 of the mirror mechanism 4 of the pico-projector device 1, made using MEMS techniques (similar considerations apply to the second mirror 25).

In detail, the first mirror 24 comprises a mobile mass 30, made of semiconductor material, for example, silicon, suspended above a substrate 31, parallel to a horizontal plane xy defined by the same substrate 31.

The mobile mass 30 has a central portion 30a, for example, circular in plan view, set on which is a mirror layer 32, constituted by a reflecting material, such as, for example, aluminum (or in general, other material used for defining electrical connections, the so-called "metallizations"); the mobile mass 30 also has end portions 30b, 30c, having an elongated shape and carrying, fixed thereto, mobile electrodes 33.

The mobile mass 30 is coupled, at its end portions 30b, 30c, to anchorages 34, fixed with respect to the substrate 31, by means of torsional springs 35, which enable rotation of the mobile mass 30 out of the horizontal plane xy.

The first mirror 24 further comprises portions 36a, 36b, fixed with respect to the substrate 31 and carrying fixed electrodes 38, in a position facing the mobile electrodes 33 and comb-fingered thereto.

In use, application, by means of the driving signals $S_d$, of a difference of potential between the mobile electrodes 33 and the fixed electrodes 38 causes rotation of the mobile mass 30 (and of the associated mirror layer 32), according to the desired scanning movement of the light beam 3. In particular, in the case of horizontal scanning, an oscillatory motion is generated at the resonance frequency of the mechanical structure.

Figure 5A:
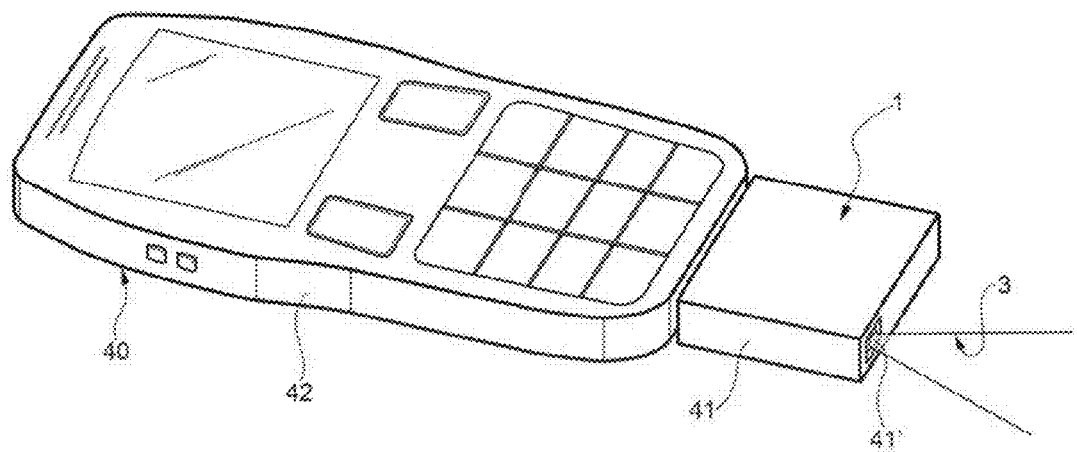
FIGS. 5a and 5b show variations of a coupling between the pico-projector device of FIG. 1 and a portable electronic apparatus.

As illustrated in FIG. 5a, the pico-projector device 1 may be provided as separate and stand-alone accessory with respect to an associated portable electronic apparatus 40, for example, a mobile phone or a smartphone, being coupled to the portable electronic apparatus 40 by means of suitable electrical and mechanical connection elements (not illustrated in detail). In this case, the pico-projector device 1 is provided with a own casing 41, which has at least one portion 41' transparent to the light beam 3 coming from the mirror mechanism 4; the casing 41 of the pico-projector device 1 is releasably coupled to a respective casing 42 of the portable electronic apparatus 40.

Figure 5B:
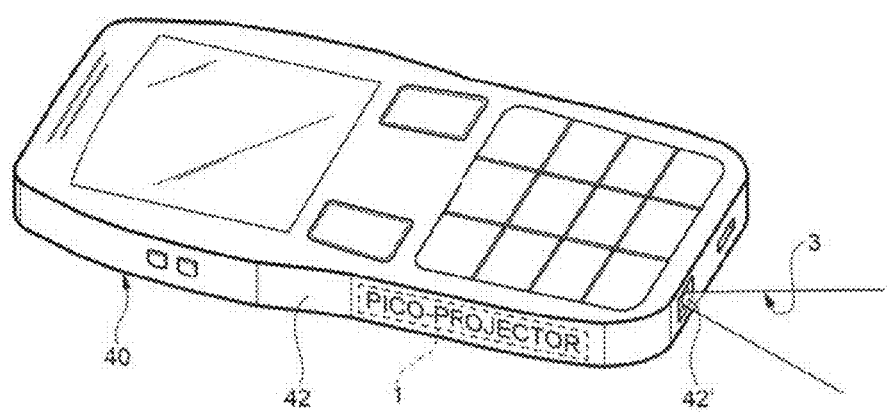

Alternatively, as shown in FIG. 5b, the pico-projector device 1 may be integrated inside the portable electronic apparatus 40, being set inside the casing 42 of the portable electronic apparatus itself 40, which has in this case a respective portion 42' transparent to the light beam 3 coming from the mirror mechanism 4. The pico-projector device 1 is in this case, for example, coupled to a printed circuit board inside the casing 42 of the portable electronic apparatus 40.

The advantages of the pico-projector device previously described emerge clearly from the foregoing discussion.

In particular, it is again emphasized that it enables generation of images stabilized with respect to undesirable movements, for example, due to vibrations of the portable electronic apparatus to which it is associated, or in general to noise coming from the external environment.

The images generated and projected on the displaying surface are hence sharper and noise-free, markedly improving the user's perception.

Moreover, the solution described does not require any significant increase in the size of the pico-projector device and of the associated portable electronic apparatus and may also envisage the use of gyroscopic sensors already present on board the portable electronic apparatus.

Finally, it is clear that modifications and variations may be made to what has been described and illustrated herein, without thereby departing from the scope of the present invention, as defined in the annexed claims.

In particular, it is evident that the compensation operation carried out as a function of the angular velocity signals detected by the gyroscopic sensor may envisage further and different filtering and processing operations according to the specific needs and situations of use.

Furthermore, for the same compensation operation, the use of further information may be envisaged, for example, information of acceleration coming from an accelerometer sensor on board the portable electronic apparatus.

It is likewise evident that the pico-projector device 1 may be made in a way different from what has been illustrated by way of example.

For instance, the mirror mechanism 4 may possibly include a single mirror actuatable with a bidirectional movement, in both the horizontal and vertical directions. In addition, the light source may differ from the RGB laser source. Also the system for scanning the light beam for formation of the images on the displaying surface may possibly differ from the raster scanning method described previously in detail.

The pico-projector device 1 may in any case be advantageously used in combination with a wide range of portable electronic apparatuses, such as: mobile phones, smartphones, PDAs, tablets, digital audio players, controllers for videogames, etc.

Moreover, even though the pico-projector device 1 is particularly advantageous for use in portable apparatuses, it may be used in general for displaying images in environments that are subject to disturbance and vibrations, such as, for example, moving vehicles, coaches, planes, or trains, instead of using image-display systems of a traditional type.

What is claimed is:

1. A pico-projector device, comprising:
   a light source operable to generate a light beam as a function of an image to be generated;
   a mirror mechanism operable to direct the light beam towards a displaying surface; and
   a driving circuit configured to supply driving signals for movement of said mirror mechanism, said driving circuit further comprising:
   a generator stage for receiving an image array and generating control signals; and
   a compensation stage configured to receive angular velocity signals from a gyroscopic sensor coupled to said pico-projector device, and to generate compensation signals by multiplication of the angular velocity signals with a corrective factor, and to subtract the compensation signals from the control signals to generate said driving signals for stabilizing the image projected on said displaying surface with respect to undesired movements of said pico-projector device.

2. The device according to claim 1, wherein said generator stage is configured to generate the control signals for said mirror mechanism as a function of said image to be generated and of a desired scanning path on said displaying surface.

3. The device according to claim 1, wherein said compensation stage comprises: a processing unit configured to filter said angular velocity signals so as to remove components of the angular velocity signals relating to desired movements of said pico-projector device and leave components relating to said undesired movements of said pico-projector device for generation of said compensation signals.

4. The device according to claim 2, wherein said mirror mechanism is operable to perform horizontal scanning and vertical scanning movements with respect to said displaying surface as a function of respective driving signals; and wherein said compensation signals include a first compensation signal generated as a function of a yaw angular velocity and/or of a roll angular velocity, designed to compensate undesired movements regarding said horizontal scanning movement; and a second compensation signal generated as a function of a pitch angular velocity, designed to compensate undesired movements regarding said vertical scanning movement.

5. The device according to claim 4, wherein said mirror mechanism is of a MEMS type and comprises a first mirror operable for performing said horizontal scanning movement; and a second mirror operable for performing said vertical scanning movement.

6. The device according to claim 1, wherein said undesired movements are due to vibrations from the external environment.

7. The device according to claim 1, including, in an integrated manner, said gyroscopic sensor.

8. The device according to claim 1, wherein the light source, mirror mechanism and driving circuit are provided within a portable electronic apparatus.

9. The device according to claim 1, wherein the light source, mirror mechanism and driving circuit are provided within an accessory device having a casing releasably coupled to a respective casing of a portable electronic apparatus.

10. The device according to claim 1, wherein the light source, mirror mechanism and driving circuit are provided in an integrated manner inside a casing of a portable electronic apparatus.

11. The device of claim 8, wherein the portable apparatus is selected from the group consisting of: a mobile phone; a smartphone; a PDA; a tablet; a digital audio player; a controller for videogames.

12. An image stabilization method, comprising:
generating control signals for projecting an image with a light beam towards a displaying surface;
receiving angular velocity signals from a gyroscopic sensor coupled to a pico-projector device having a light source operable to generate the light beam;
applying a corrective factor to the angular velocity signals to generate compensation signals; and
generating driving signals for controlling movement of said mirror mechanism by subtracting the compensation signals from the control signals thereby stabilizing the image projected on said displaying surface with respect to undesired movements of said pico-projector device.

13. The method according to claim 12, further comprising filtering said angular velocity signals so as to remove components of the angular velocity signals relating to desired movements of said pico-projector device and leave components relating to said undesired movements of said pico-projector device.

14. A projector device, comprising:
a gyroscopic sensor configured to generate angular velocity signals indicative of both desired movements of the projector device and undesired movements of the projector device;
a light source configured to generate a light beam;
a movable mirror configured to direct the light beam;
a mirror drive circuit configured to control movement of the movable mirror using drive signals; and
a compensation circuit within the mirror drive circuit that receives the angular velocity signals and filters the angular velocity signals to discriminate the undesired movements from the desired movements, generate correction signals by multiplication of the angular velocity signals for the undesired movements with a corrective factor and generate said drive signals by subtracting the correction signals from control signals related to an image.

15. The device according to claim 14, wherein the control signals are generated in the mirror drive circuit including a generator stage configured to generate the control signals for controlling movement of the moveable mirror as a function of the image to be generated.

* * * * *